(No Model.) 2 Sheets—Sheet 1.
T. A. EDISON.
TRANSMISSION OF POWER.
No. 493,858. Patented Mar. 21, 1893.
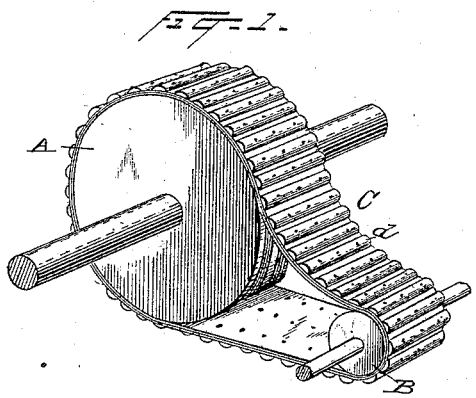
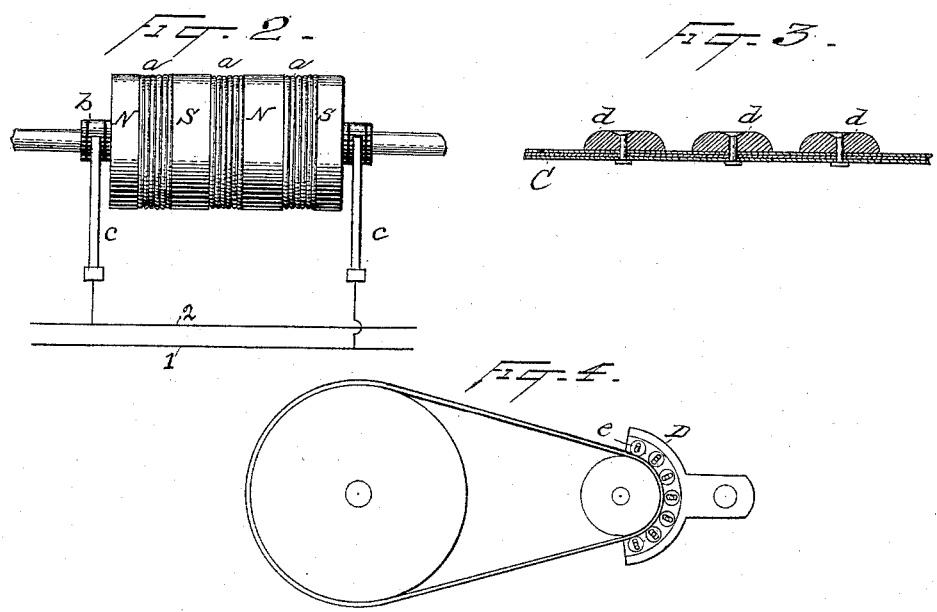

(No Model.) 2 Sheets—Sheet 2.
T. A. EDISON.
TRANSMISSION OF POWER.
No. 493,858. Patented Mar. 21, 1893.
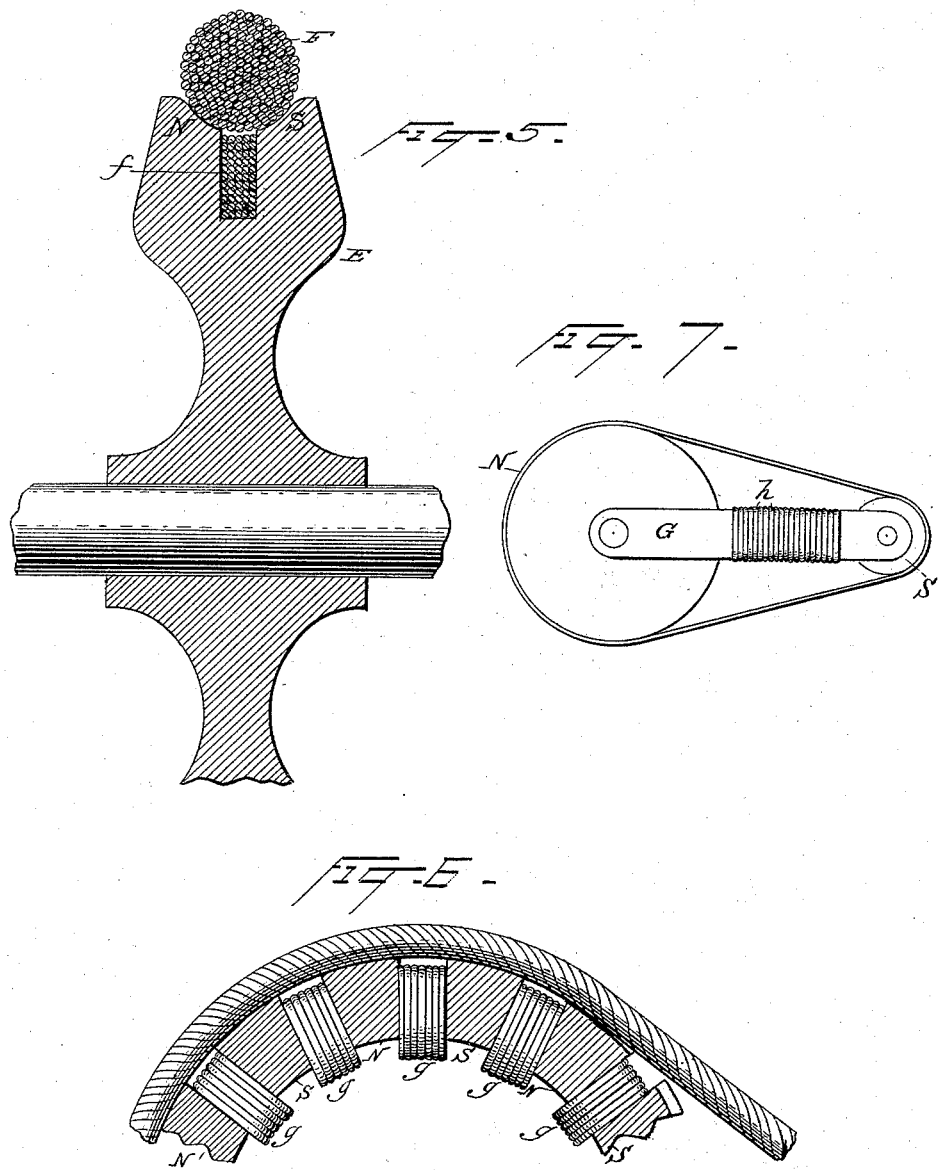

UNITED STATES PATENT OFFICE.

THOMAS A. EDISON, OF LLEWELLYN PARK, NEW JERSEY.

TRANSMISSION OF POWER.

SPECIFICATION forming part of Letters Patent No. 493,858, dated March 21, 1893.

Application filed August 28, 1890. Serial No. 363,256. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in the Transmission of Power, (Case No. 873,) of which the following is a specification.

The object of this invention is to produce a new mechanical movement by the aid of magnetism which will permit the positive transmission of large powers at high velocities without the excessive noise incident to the use of toothed gearing. This I accomplish by the employment of smooth face iron pulleys or wheels which are made strongly magnetic by suitable windings connected in circuit with a suitable source of electrical energy, and by the use of endless belts, chains or ropes hereinafter called generically belts, which are either themselves magnetic, or carry iron bars, (or both,) which form armatures to close the magnetic circuits at the pulleys, and are strongly attracted to the faces of the pulleys so as to increase the adhesion and transmit the power without slip. Or, the magnetic bars, instead of being carried directly by the belts, chains or ropes, may be arranged in a frame over the belt, chain or rope where it passes around the pulley, and be capable of a movement toward the pulley to a limited extent, so as to press the belt, chain or rope upon the pulley.

In the accompanying drawings forming a part hereof,—Figure 1 is a perspective view showing one construction embodying the invention. Fig. 2 is an elevation of one of the pulleys of Fig. 1. Fig. 3 is a sectional view of a portion of the endless belt of Fig. 1, with the iron bars secured thereto. Fig. 4 is a side elevation of a modified form of the apparatus showing the magnetic bars separate from the endless belt. Fig. 5 is a sectional view of a magnetic wheel with a wire rope serving as an armature. Fig. 6 is a side elevation showing a modified construction of the wheel driven by the wire rope. Fig. 7 is a side elevation showing a further modification of the means for producing magnetism in the pulleys or wheels.

Referring particularly to Figs. 1, 2 and 3; A and B are two iron pulleys mounted upon parallel shafts and connected by an endless belt C. Each of these pulleys is provided with several circumferential grooves, shown more particularly in Fig. 2, in which are located windings $a$ of insulated wire, connected at the ends to insulated rings $b$, upon which bear contact springs $c$. These contact springs being connected with a suitable source of electrical energy, indicated by the circuit 1, 2, each pulley becomes strongly magnetic as indicated by the letters N, S, in Fig. 2, the circumferential ribs or exposed faces of the pulley on opposite sides of each of the windings being oppositely magnetized. The belt C is preferably constructed of a number of thin sheet steel strips placed one over the other as shown in Fig. 3, and upon the outside of these are secured, like the rounds of a ladder, cross bars $d$ of soft iron which are riveted to the belt, the strips of steel being at the same time riveted together so as to form a continuous belt. The steel belt and the bars $d$ bridge the windings of the two pulleys completing the magnetic circuits around the windings, thus forming armatures or keepers for the magnetic poles produced upon the pulleys. These magnetic circuits being exceedingly short and of remarkably low resistance, the attraction of the many keepers to the pulleys produces a great adhesion of the belt to the pulleys, thus permitting large powers to be transmitted through relatively small belts. Experience has shown that with a four-inch pulley and a belt three inches wide, making contact only over one-half of the circumference, the belt will sustain a dead weight of two hundred pounds without the magnets reaching saturation. It will thus be seen, that we have here, by a proper proportioning of the parts, a magneto-mechanical device capable of replacing the toothed wheels in nearly all cases of power transmission.

In Fig. 4 is illustrated a construction in which, instead of placing the bars $d$ directly upon the belt, a frame D is placed on the contact side of one or of each pulley, and in this frame are mounted magnetic rollers $e$ having slotted bearings so as to be capable of a limited movement toward the pulley. The belt passes under these rollers, and by the attraction of the rollers toward the pulley, the adhesion of the belt is increased.

In Fig. 5 the device is an iron wheel E provided with a grooved face in which runs a wire rope F. The wheel is slotted circumferentially and provided with a magnetic winding $f$ which strongly magnetizes the wheel, giving the opposite sides of its rim opposite polarities. The wire rope acts as an armature or keeper to the magnetic poles forming a magnetic circuit of exceedingly low resistance and resulting in a powerful adhesion of the rope to the wheel.

Instead of winding the wheel E circumferentially, its rim may be provided with transverse grooves in which windings $g$ will be placed, making the projecting surfaces of the wheels between these windings alternately of opposite polarity as indicated in Fig. 6. The wire rope acts as an armature or keeper for all the magnets thus formed.

Instead of winding each wheel or pulley, in cases where the wheels or pulleys are sufficiently near to permit of the employment of the construction, the pulleys are connected by an iron frame G which is provided with the magnet winding $h$, thus making one pulley of one polarity, and the other of the other polarity, a magnetic belt, rope or chain being used to complete the magnetic circuit between the two pulleys or wheels. This construction does not produce as powerful magnets as in the constructions already described. It is simply given as an illustration of the fact that the invention is capable of being carried out in many forms of construction, and is not limited to the special constructions illustrated.

It is obvious that while a belt of magnetic material such as the laminated steel belt described is desirable, in order to secure the full advantages of the invention, yet the invention may be used to increase the adhesion of belts of non-magnetic material, such as leather, rubber cloth and the like. If the endless belt C of Fig. 1 were a leather or rubber cloth belt, it is evident that the magnetic bars $d$ would increase the adhesion of the belt to the pulleys, while if the belt of Fig. 4 were of non-magnetic material, the magnetic rollers $e$ would increase its adhesion.

What I claim as my invention is—

1. A pulley or wheel having one or more circumferential magnet windings and provided with exposed circumferential surfaces of opposite polarity on the opposite sides of each of said windings, in combination with an endless belt, passing over said pulley or wheel, and held thereto by magnetic attraction, substantially as set forth.

2. The combination with a pulley or wheel provided with one or more circumferential windings, and having exposed circumferential surfaces of opposite polarity at the sides of the windings, of an endless belt passing over the said pulley or wheel, and armatures or keepers closing the magnetic circuit around the winding or windings and acting to increase the adhesion between the pulley or wheel, and the belt, substantially as set forth.

3. The combination with a pulley or wheel having one or more circumferential magnet windings and exposed circumferential surfaces of opposite polarity, of an endless belt of magnetic material passing over said pulley or wheel and closing the magnetic circuit around the winding or windings, substantially as set forth.

4. The combination with a pulley or wheel made magnetic by a suitable winding, of a belt constructed of thin, steel strips riveted together, substantially as set forth.

5. The combination with a pulley or wheel made magnetic by a suitable winding, of a belt constructed of a number of thin strips of steel riveted together and provided with cross bars of iron secured externally thereto, substantially as set forth.

6. The combination with a pulley or wheel having two or more circumferential windings and provided with three or more exposed circumferential surfaces of alternating polarity, of an endless belt, passing over said pulley or wheel and held thereto by magnetic attraction, substantially as set forth.

This specification signed and witnessed this 9th day of August, 1890.

THOS. A. EDISON.

Witnesses:
RICHD. N. DYER,
W. PELZER.